United States Patent [19]
Jensen

[11] Patent Number: 6,066,898
[45] Date of Patent: May 23, 2000

[54] MICROTURBINE POWER GENERATING SYSTEM INCLUDING VARIABLE-SPEED GAS COMPRESSOR

[75] Inventor: Davis Jensen, Lomita, Calif.

[73] Assignee: AlliedSignal Inc., Morristown, N.J.

[21] Appl. No.: 09/134,254

[22] Filed: Aug. 14, 1998

[51] Int. Cl.[7] .................................................. F01D 15/10
[52] U.S. Cl. ............................ 290/52; 290/32; 60/597
[58] Field of Search .................................. 290/32, 36 R, 290/40 R, 46, 52; 60/597, 605, 608

[56] References Cited

U.S. PATENT DOCUMENTS

| | | | |
|---|---|---|---|
| 4,694,654 | 9/1987 | Kawamura | 60/605 |
| 4,745,755 | 5/1988 | Kawamura | 60/608 |
| 4,757,686 | 7/1988 | Kawamura et al. | 60/608 |
| 4,769,993 | 9/1988 | Kawamura | 60/597 |
| 4,886,978 | 12/1989 | Kawamura | 290/52 |
| 5,079,913 | 1/1992 | Kishishita | 60/597 |
| 5,121,605 | 6/1992 | Oda et al. | 60/608 |
| 5,605,045 | 2/1997 | Halimi et al. | 60/607 |
| 5,831,341 | 11/1998 | Selfors et al. | 290/52 |
| 5,893,423 | 4/1999 | Selfors et al. | 180/65.2 |

*Primary Examiner*—Nicholas Ponomarenko
*Attorney, Agent, or Firm*—Felix L. Fischer; Ephraim Starr

[57] ABSTRACT

A microturbine power generating system includes a combustor and a gas compressor that provides a flow of natural gas to a combustor. The flow of natural gas is regulated by varying the speed of the gas compressor to maintain gas compressor discharge pressure at a set point. The system further includes a turbine and an electrical generator that is driven by the turbine during a run mode of operation. A rectifier and a main inverter convert an output of the electrical generator into fixed frequency ac power during the run mode. A secondary inverter operates an electric motor of the gas compressor at the variables speeds during the run mode. During a startup mode, however, the main inverter operates the gas compressor motor, and the secondary inverter operates the electrical generator as a starter motor.

20 Claims, 3 Drawing Sheets

MICROTURBINE POWER GENERATING SYSTEM INCLUDING VARIABLE-SPEED GAS COMPRESSOR

BACKGROUND OF THE INVENTION

The present invention relates generally to microturbine power generating systems. More specifically, the present invention relates to a microturbine power generating system including a combustor and a gas compressor for supplying gaseous fuel to the combustor.

A microturbine power generation unit can operate on liquid fuel or gaseous fuel. Natural gas is a desirable gaseous fuel because it is relatively inexpensive and readily available. It can be supplied by tapping into an existing natural gas line. For microturbine power generation units located in oil fields, the natural gas is free. Natural gas normally be flared at well heads may instead be used to power the microturbine power generation units.

A microturbine power generation unit that is adapted to run on gaseous fuel might include a combustor, a motor-driven gas compressor, a control for operating the gas compressor at a constant speed to provide a maximum flow rate of gas, and a fuel control valve assembly for accurately regulating fuel flow to the combustor. The fuel control valve assembly might include a flow control valve, a pressure regulator, and a shutoff valve.

There are certain drawbacks associated with adapting a microturbine power generation unit in such a manner. One drawback is that operating the gas compressor at constant speed can be inefficient. The compressor provides compressed gas at a maximum flow rate even though the maximum flow rate might not be needed (e.g., when the microturbine generation unit output varies). Compressed gas that is not needed is returned to an inlet of the compressor. However, energy is wasted on compressing the gas that is returned to the compressor inlet.

Pressure variations in the supply line can also reduce the efficiency of the gas compressor operating at constant speed. Pressure variations might increase the flow rate above what is needed. Consequently, compressed gas that is not needed is returned to the compressor inlet. More energy is wasted.

Another drawback is the addition of an inverter for supplying an excitation current to the compressor motor. The inverter can be relatively expensive.

Yet another drawback is that the fuel control valve assembly can be complex and relatively expensive.

SUMMARY OF THE INVENTION

These drawbacks are addressed by the present invention, which can be regarded as a microturbine power generating system. The microturbine power generating system includes a combustor for combusting gaseous fuel and an oxidant to produce gaseous heat energy; a turbine for converting the gaseous heat energy into mechanical energy; and an electrical generator for converting the mechanical energy produced by the turbine into electrical energy. The microturbine power generating system further includes a gas compressor for supplying the gaseous fuel to the combustor; and means for operating the gas compressor at variable speeds to maintain a desired gas compressor pressure at a set point. Gaseous fuel flow to the combustor can be regulated by varying the speed of the gas compressor to maintain the desired pressure at the set point.

DESCRIPTION OF THE PREFERRED EMBODIMENT

Figure 1:
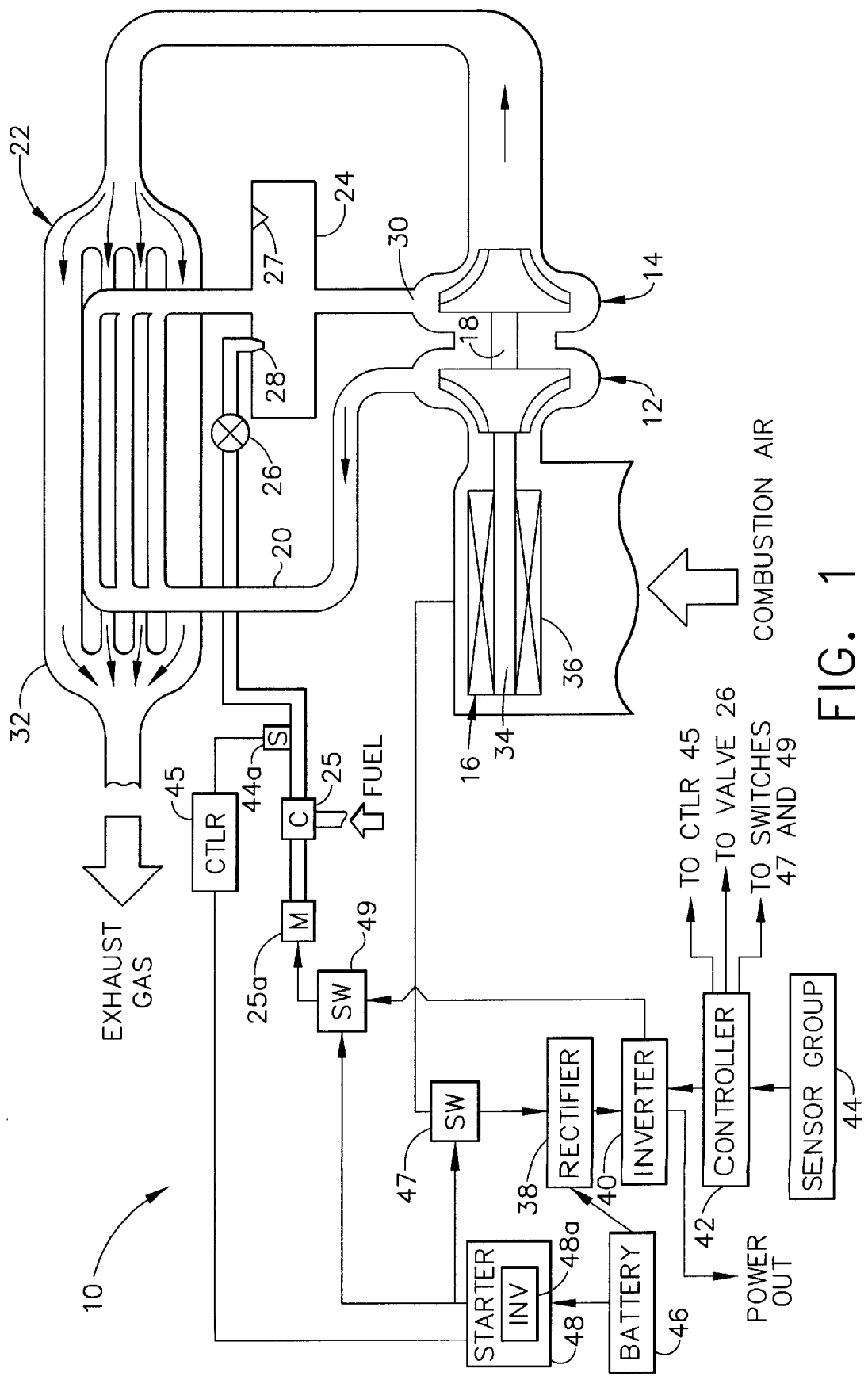
FIG. 1 is a block diagram of a microturbine power generating system according to the present invention.

Referring to FIG. 1, a microturbine power generating system 10 according to the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 are rotated by a single common shaft 18. Although the compressor 12, turbine 14 and electrical generator 16 can be mounted to separate shafts, the use of the single common shaft 18 adds to the compactness and reliability of the power generating system 10.

The shaft 18 can be supported by self-pressurized air bearings such as foil bearings. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Gaseous fuel is also supplied to the combustor 24. Any suitable gaseous fuel can be used. Choices of fuel include natural gas, flair gas, off gas, gasoline, naphtha, propane, JP-8, methane and other man-made gases. The fuel is injected into the combustor 24 by an injection nozzle 28.

The gaseous fuel is supplied to the combustor 24 by a variable-displacement gas compressor 25 such as a reciprocating compressor or a rotating compressor. The gas compressor 25 is driven at variable speeds by an ac induction motor 25a. A shutoff valve 26 is located midstream between the combustor 24 and the gas compressor 25.

Inside the combustor 24 the fuel and compressed air are mixed and ignited by an igniter 27 in an exothermic reaction. Hot, expanding gases resulting from combustion in the combustor 24 are directed to an inlet nozzle 30 of the turbine 14. The inlet nozzle 30 has a fixed geometry. The hot, expanding gases resulting from the combustion are expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet machine having permanent magnet rotor 34 and stator windings 36. The rotor 34 is attached to the shaft 18. When the rotor 34 is rotated by turbine power, an alternating current is induced in the stator windings 36. Speed of the turbine 14 can be varied in accordance with external energy demands placed on the system 10. Variations in the turbine speed will produce a variation in the frequency of the alternating current generated by the electrical generator 16. Regardless of the frequency of the ac power generated by the electrical generator 16, the ac power can be rectified to dc power by a rectifier 38, and then chopped by a solid-state electronic inverter 40 (the "main" inverter 40) to produce ac power having a fixed frequency. Accordingly, when less power is required, the turbine speed can be reduced without affecting the frequency of the ac output.

A battery 46 and a starter control 48 including a secondary inverter 48a are also provided. Power is supplied to the secondary inverter 48a by the battery 46. Depending upon the states of first and second switches 47 and 49, the secondary inverter 48a can supply an excitation current to either the electrical generator 16 or the gas compressor motor 25a. When the excitation current is supplied to the electrical generator 16, the electrical generator 16 functions as a starter motor. When the excitation current is supplied to the gas compressor motor 25a, the gas compressor motor 25a drives the compressor 25. Depending upon the states of the switches 47 and 49, the main inverter 40 can supply an excitation current to the gas compressor motor 25a (with power being supplied by the battery 46), or the main inverter 40 can convert rectified generator output power to fixed frequency ac power.

The secondary inverter 48 can control motoring speed by varying frequency and amplitude of the excitation current. Such an inverter 48a might include commutation logic that generates commutation commands in response to motor speed commands, and solid state power drivers that generate the excitation current in response to the commutation commands. The main inverter 40 could also control motoring speed by varying frequency and amplitude of the excitation current. However, the main inverter 40 could have a simpler and less expensive construction that controls motor speed and performs up-chopping at a fixed frequency. Power and size specifications of the secondary inverter 48a are based on operating the electrical generator 16 as a starter motor. Power and size specifications of the main inverter 40 are based on converting the rectified ac generator power to fixed frequency ac power.

A primary controller 42 controls the switches 47 and 49, sends commands to the main inverter 40, and enables a secondary controller 45 to send commands to the secondary inverter 48a. During startup mode, the primary controller 42 commands the main inverter 40 to operate the gas compressor motor 25a. In response, the gas compressor 25 supplies fuel to the combustor 24. During startup mode, the primary controller 42 also enables the secondary controller 45 to command the secondary inverter 48a to supply an excitation current to the electrical generator 16. In response, the electrical generator 16 functions as a starter motor.

When the shaft speed is accelerated to a level at which electrical power can be produced, the primary controller 42 switches over from startup mode to run mode.

During the run mode of operation, the primary controller 42 commands the main inverter 40 to convert rectified generator power to fixed frequency ac power. During the run mode of operation, the main inverter 40 also enables the secondary controller 48a to command the secondary inverter 48a to operate the gas compressor motor 25a. Thus, only two inverters 40 and 48a are used to perform ac power conversion, operate the electrical generator 16 as a starter motor, and operate the gas compressor motor 25a.

The primary controller 42 receives sensor signals generated by a sensor group 44. The sensor group 44 may include various temperature and pressure sensors for measuring various parameters of the power generating system 10. For example, the sensor group 44 may include a shaft speed sensor and a turbine outlet temperature sensor.

The primary controller 42 can receive an external command to supply a fixed current and voltage. The primary controller 42 can also receive a command to operate the power generating system 10 in a load following mode, in which a constant voltage is maintained and current is allowed to fluctuate based on the power demands.

Fuel flow rate is regulated by varying the speed of the gas compressor 25 to maintain gas compressor discharge pressure at a desired set point. When the discharge pressure is at the set point, the gas compressor 25 is delivering the correct flow of fuel to the gas compressor 25. The set point is computed by the primary controller 42. The primary controller 42 may use a lookup table to preselect a pressure/fuel flow for a desired output power and speed, and then use an error correction algorithm to fine-tune the set point.

The secondary controller 45 receives the set point for gas compressor discharge pressure from the primary controller 42. The secondary controller 45 also receives a feedback signal indicating a measured discharge pressure of the gas compressor 25. The gas compressor discharge pressure can be measured by a pressure sensor 44a midstream the gas compressor 25 and the combustor 24. The secondary controller 45 implements a closed loop control that generates commands for the secondary inverter 48a. In response to these commands, the secondary inverter 48a generates an excitation current for the gas compressor motor 25a. If the measured discharge pressure increases above the set point, the secondary controller 45 responds by commanding a reduction in the compressor speed until the measured discharge pressure returns to the set point. If the discharge pressure falls below the set point, the secondary controller 45 responds by commanding an increase in the compressor speed until the measured discharge pressure returns to the set point. Thus, fuel flow is regulated without the use of a complex valve assembly, and it is regulated without returning air to the compressor inlet and wasting energy.

Figure 3:
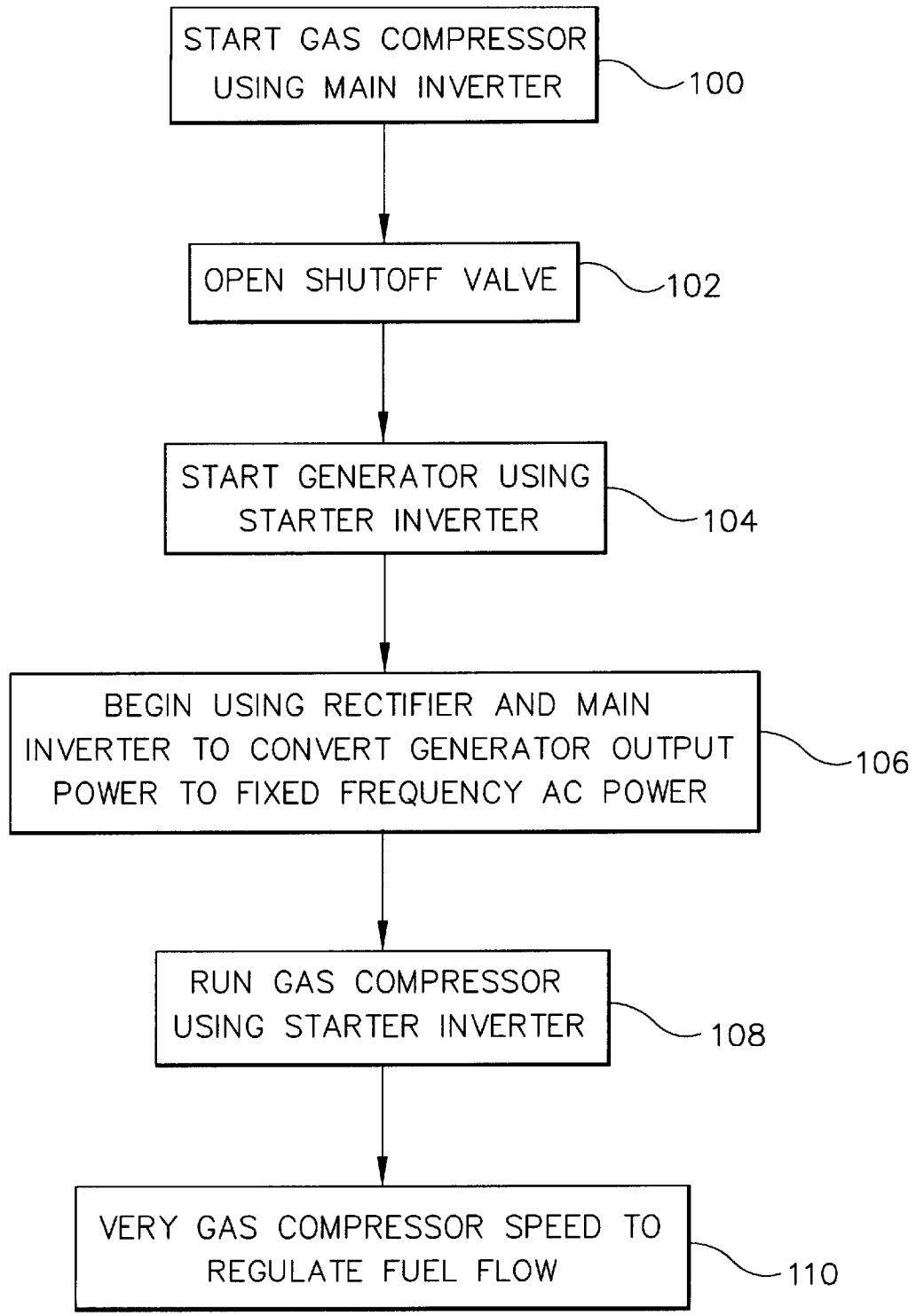
FIG. 3 is a flowchart of a method of operating the microturbine power generating system according to the present invention.

Referring additionally to FIG. 3, the microturbine power generating system 10 is operated during the startup and run modes as follows. During the startup mode, the primary controller 42 starts the gas compressor 25 by commanding the main inverter 40 and the second switch 49 to supply an excitation current to the gas compressor motor 25a (block 100). During the startup mode, the gas compressor 25 is operated at a constant speed to provide maximum output. The primary controller 42 also commands the shutoff valve 26 to allow compressed gas to flow into the combustor 24 (block 102).

Then the primary controller 42 commands the first switch 47 and the starter control 48 to supply an excitation current to the stator windings 36 of the electrical generator 16. This causes the generator 16 to operate as a starter motor (block 104).

Once combustion occurs and the starter motor function is no longer needed, the primary controller 42 commands the main inverter 40 and the second switch 49 to stop supplying the excitation current to the gas compressor motor 25a. Instead, the primary controller 42 commands the first switch 47 to send ac power from the generator 16 to the rectifier 38 and it commands the main inverter 40 to chop the rectified power to produce ac output power at a desired frequency (block 106).

The primary controller 42 also controls the second switch 49 and sends a set point to the secondary controller 45, which sends speed commands to the secondary inverter 48a. This allows the secondary inverter 48a to supply an excitation current to the motor 25a of the gas compressor 25 (block 108).

Under command of the secondary controller 45, compressor speed is varied to maintain the gas compressor discharge pressure at the set point (block 110). Thus, the gas compressor 25 is operated efficiently, using fuel only as needed. Additionally, the gas compressor motor 25a is operated without the use of a standalone inverter.

As for the shutoff valve 26, it is merely opened and closed to start and stop the flow of gaseous fuel to the combustor 24.

Figure 2:
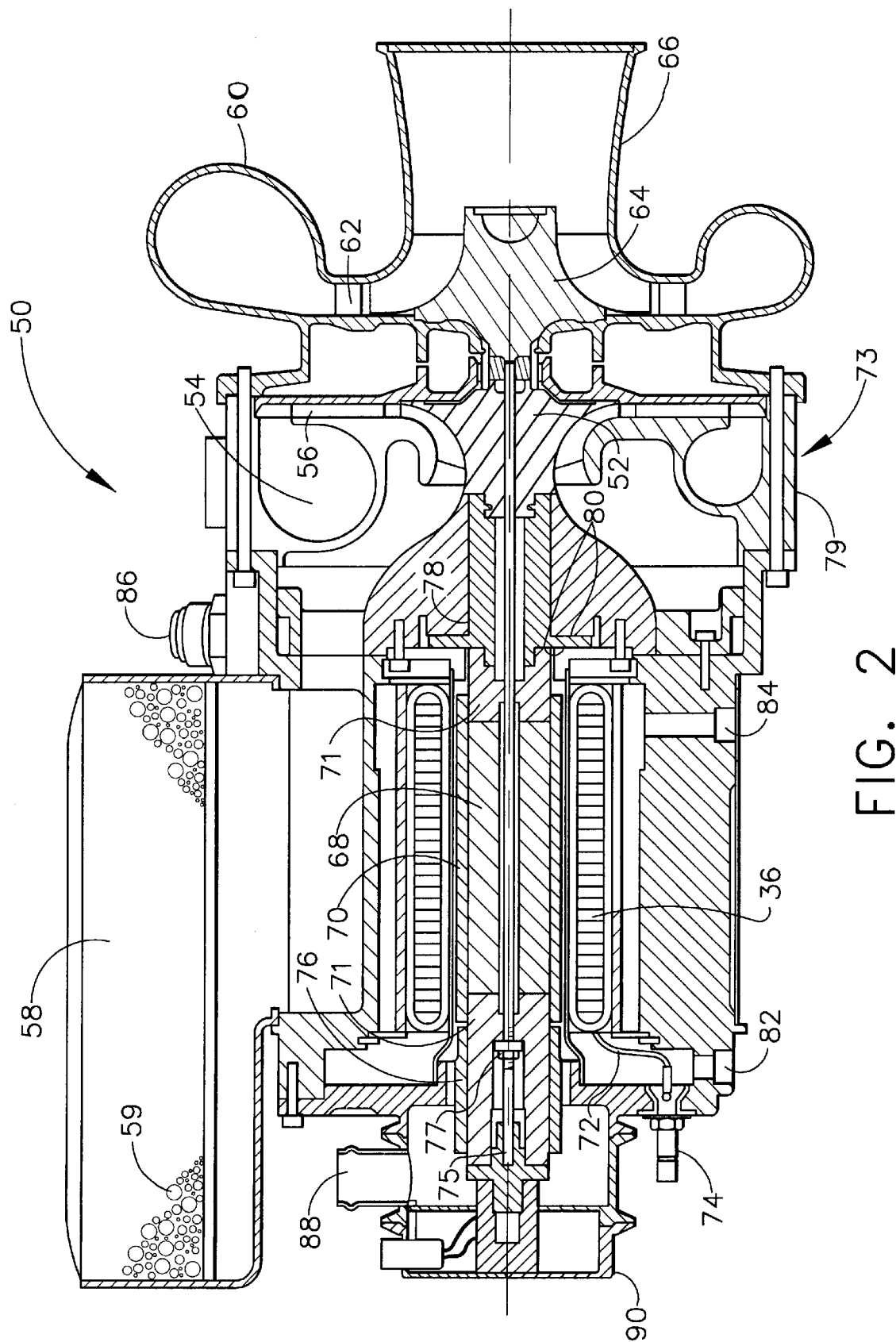
FIG. 2 is a cross-sectional view of an engine core for the microturbine power generating system.

Referring now to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. End caps 71 are secured to the containment sleeve 70 and supported by journal foil bearings 76 and 78 and a thrust foil bearing 80. Power conductors 72 extend from the stator windings 36 and terminate in a power connector stud 74, which is secured to a housing 73.

The housing 73 provides support for a fuel inlet, the air inlet 58, the compressor 12, the turbine 14, the generator 16, the recuperator 22, the combustor 24, the rectifier 38, and the main inverter 40, to enable the system 10 to exist as a packaged unit. The housing is supported at its base 79.

The impeller wheel 52, turbine wheel 64 and rotor 34 are clamped together by a tie-bolt 75 having a diameter of approximately 0.25 inches to 0.5 inches. The tie-bolt 75 can be made of a material such as Inconel 718. The tie-bolt 75 extends through bores in the rotor 34 and the compressor impeller 52. The tie-bolt 75 does not extend through the turbine wheel 64. Instead, it is inertia-welded to the back of the turbine wheel 64. Thus, the turbine wheel 64 is boreless in that it does not have a bore through which the tie-bolt 75 extends. Eliminating the bore reduces stresses in the turbine wheel 64. When clamped together by the tie-bolt 75, the compressor impeller 52, the turbine wheel 64 and the rotor 34 are rotated as a single unit.

During assembly, the tie-bolt 75 is preloaded in tension, the impeller 52 and the rotor 34 are slid over the tie-bolt 75, and a nut 77 is secured to a threaded end of the tie-bolt. Preloading the tie-bolt 75 keeps the impeller 52, turbine wheel 64 and rotor in compression at high rotational speeds (80,000 rpm and above) and high operating temperatures. For example, the tie-bolt 75 can be preloaded in tension to about 90% of yield strength. The tension in the tie-bolt 75 is maintained as the nut 77 is turned.

The rotating unit 52, 64 and 34 is supported in a radial direction by inboard and outboard foil journal bearings 76 and 78. The rotating unit 52, 64 and 34 is supported in an axial direction by a foil thrust bearing 80.

Various coolant ports are provided for the engine core 50. Provided are ports 82 and 84 for circulating a coolant over the stator windings 36. Also provided are ports 86 and 88 for circulating a coolant over the foil bearings 76, 78 and 80. A cap 90 provides closure for the housing.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided as an example. Air is compressed in a single stage radial compressor to 3.8 bars. The compressed air can be directed to the recuperator 22 where the temperature of the compressed air is increased using the waste heat from the turbine exhaust gas. The temperature of the exhaust gas from the turbine is limited to about 1,300° F. in order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a Nox level of less than 25 ppm, and a combustor 24 using a catalyst can yield a Nox rate that is virtually undetectable (commercial Nox sensors are limited to a 2 to 3 ppm detection range). The high enthalpic gas is then expanded through the turbine 14. The impeller 52, the turbine wheel 64, the rotor 34, and the tie-bolt 75—the only moving parts in the engine core 50—spin as a single unit at high speeds of approximately 80,000 rpm or more. The resulting generator output frequency of around 1,200 hertz is then reduced by the rectifier 38 and the main inverter 40 to a grid-compatible 50 or 60 cycles. Resulting is a high power density typified by low weight (about a third of the size of a comparable diesel generator) and a small footprint (for example, approximately three feet by five feet by six feet high).

The high power density and low weight of the microturbine power generating system 10 is made possible through the high speed components which permit large amounts of power using a minimum amount of material. The microturbine power generating system 10 can be completely self-contained in a weather proof enclosure. The power generating system 10 is "plug and play", requiring little more than a supply of clean fuel.

Thus disclosed is a power generating system 10 having a low thermal signature and minimal noise generation. The use of air bearings eliminates the need for an oil-based lubrication system. The electrical generation system 10 has high reliability and minimal service requirements due to single moving part design. The use of a solid-state electronic inverter allows the system 10 to provide a variable AC output. Installation is easy due to a modular and self-contained design, and servicing is easy because the system 10 has one moving part and major parts that are easily accessible. The width, length and height of the engine core 50 can be adjusted to fit a wide variety of dimensional requirements.

The microturbine power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

The microturbine power generating system 10 can be operated with natural gas, which is inexpensive and readily available. Use of natural gas reduces the operational costs.

Fuel flow is regulated accurately by the gas compressor 25 instead of a complex valve assembly. Operating the gas compressor at variable speeds allows the complex valve assembly to be replaced by a simple shutoff valve. In turn, cost of the microturbine power generating system is reduced. Operating the gas compressor 25 at variable speed is also more efficient than constant speed operation.

Although the microturbine power generating system 10 includes a gas compressor 25, it does not need a standalone inverter for the gas compressor 25. Instead, excitation current can be supplied to the drive motor 25a of the gas compressor 25 by inverters already existing in the system 10. Use of the existing inverters helps to reduce the cost of the microturbine power generating system 10.

The invention is not limited to the specific embodiments disclosed above. For example the functions of the primary and secondary controllers 42 and 45 could be performed by a single controller. The main and secondary inverters 40 and 48a can be configured in any number of ways to start and run the system 10. First and second switches 47 and 49 were shown merely to illustrate the different configurations. Instead of controlling switches, the primary controller 42 could configure the inverters 40 and 48a directly.

Thus, the present invention is not limited to the specific embodiments disclosed above. Instead, the present invention is construed according to the claims that follow.

What is claimed is:

1. A microturbine power generating system comprising:
   a combustor for combusting gaseous fuel and an oxidant to produce gaseous heat energy;
   an air compressor for providing air for said combustor;
   a turbine for converting the gaseous heat energy into mechanical energy;
   an electrical driven by said turbine generator for converting the mechanical energy produced by the turbine into electrical energy;
   a gas compressor for supplying the gaseous fuel to the combustor; and
   first means for operating the gas compressor at variable speeds to maintain a desired pressure of the gas compressor at a set point; wherein gaseous fuel flow to the combustor is regulated by varying the speed of the gas compressor to maintain the desired pressure at the set point.

2. The system of claim 1, wherein the desired gas compressor pressure is discharge pressure, whereby the first means operates the gas compressor at variable speeds to maintain compressor discharge pressure at a set point.

3. The system of claim 2, further comprising a motor, responsive to an excitation current, for driving the gas compressor; and wherein the first means includes:
   a controller, responsive to the set point and a measured gas compressor discharge pressure, for generating commands that maintain the measured pressure at the set point; and
   a first inverter for supplying the excitation current to the motor in response to the commands.

4. The system of claim 3, wherein the system is operable in a startup mode and a run mode, wherein the first inverter provides the excitation current to the motor during the run mode of operation, and wherein the first inverter provides an excitation current to the generator during the startup mode of operation.

5. The system of claim 4, further comprising a rectifier for rectifying an output of the electrical generator, and a second inverter for converting an output of rectifier to ac power during the run mode, the second inverter providing an excitation current to the motor during the startup mode of operation.

6. The system of claim 5, further comprising a primary controller for configuring the main and secondary inverters to operate during the run and startup modes.

7. The system of claim 6, wherein the primary controller configures the second inverter to start the gas compressor during the startup mode, wherein the primary controller configures the first inverter to operate the generator as a starter motor during the startup mode, wherein the primary controller configures the second inverter to perform energy conversion during the run mode, and wherein the primary controller configures the first inverter to operate the gas compressor motor during the run mode.

8. The system of claim 1, further comprising second means for providing the set point to the first means.

9. The system of claim 1, further comprising only a shutoff valve midstream between the gas compressor and the combustor.

10. A microturbine power generating system having a startup mode of operation and a run mode of operation, the system comprising:
    a combustor for combusting gaseous fuel and an oxidant to produce gaseous heat energy;
    a gas compressor for supplying the gaseous fuel to the combustor;
    a gas compressor motor;
    a turbine for converting the gaseous heat energy into mechanical energy;
    an electrical generator for converting the mechanical energy produced by the turbine into electrical energy during the run mode of operation;
    a source of electrical power;
    a main inverter for converting a rectified output of the electrical generator to ac power during the run mode of operation, the main inverter also functioning to start the gas compressor motor during the start mode of operation by inverting power from said source of electrical power; and a secondary inverter for operating the electrical generator as a starter motor during the start mode of operation by inverting power from said source of electrical power, the secondary inverter operating the gas compressor motor at variable speeds during the run mode of operation.

11. The system of claim 10, further comprising a primary controller for configuring the main and secondary inverters during the start and run modes of operation.

12. The system of claim 11, wherein the primary controller configures the main inverter to start the gas compressor motor during the startup mode, wherein the primary controller configures the secondary inverter to operate the generator as a starter motor during the startup mode, wherein the primary controller configures the main inverter to perform energy conversion during the run mode, and wherein the primary controller configures the secondary inverter to operate the gas compressor motor during the run mode.

13. The system of claim 10, further comprising a secondary controller, the secondary inverter being responsive to an output of the secondary controller to operating the gas compressor motor, the secondary controlling causing a particular pressure of the gas compressor to be maintained at a set point, wherein the primary controller also provides the set point to the secondary controller.

14. The system of claim 13, wherein the particular pressure is gas compressor discharge pressure.

15. The system of claim 10, further comprising a shutoff valve midstream between the gas compressor and the combustor, wherein only the gas compressor and the shutoff valve form a fuel flow path to the combustor.

16. A method of operating a microturbine power generating system that has a combustor, a gas compressor, a turbine, an electrical generator, a rectifier, a main inverter, and a secondary inverter, the method comprising the steps of:

operating the gas compressor to provide a flow of gaseous fuel to the combustor;

measuring discharge pressure of the gas compressor; and regulating the gaseous fuel flow by varying gas compressor speed to maintain the discharge pressure at a set point;

using the turbine to convert gaseous heat energy from the combustor into mechanical energy during a run mode of operation;

using the turbine to drive the electrical generator during the run mode of operation;

using the rectifier and the main inverter to convert an output of the electrical generator to ac power during the run mode of operation: and using the secondary inverter to operate an electrical motor of the gas compressor at the variable speeds during the run mode of operation.

17. The method of claim 16, further comprising the steps of:

using the secondary inverter to operate the electrical generator as a starter motor during a start mode of operation; and using the main inverter to operate the gas compressor motor during the start mode.

18. A method of operating a microturbine generating system that has a combustor, a gas compressor, a turbine with air compressor, an electrical generator, a rectifier, a main inverter, a secondary inverter, and a source of electrical power, the method comprising the steps of:

using the secondary inverter to operate the electrical generator as a starter motor during a start mode of operation by inverting power from said source of electrical power;

using the main inverter to operate the gas compressor motor during the start mode by inverting power from said source of electrical power;

using the turbine to convert gaseous heat energy from the combustor into mechanical energy during a run mode of operation;

using the turbine to drive the electrical generator during the run mode using the rectifier and the main inverter to convert an output of the electrical generator to ac power during the run mode; and using the secondary inverter to operate an electrical motor of the gas compressor at variable speed during the run mode.

19. The method of claim 18, wherein the gas compressor speed is varied to maintain gas compressor discharge pressure at a set point.

20. The method of claim 18, wherein the source of electrical power is a battery.

* * * * *

UNITED STATES PATENT AND TRADEMARK OFFICE
CERTIFICATE OF CORRECTION

PATENT NO. : 6,066,898
DATED : May 23, 2000
INVENTOR(S) : Davis Jensen

Page 1 of 1

It is certified that error appears in the above-identified patent and that said Letters Patent is hereby corrected as shown below:

<u>Claim 1, column 7,</u>
Line 65, should read as follows: "an electrical driven by said turbine generator for converting the mechanical energy"

Signed and Sealed this

Thirtieth Day of October, 2001

Attest:

*Nicholas P. Godici*

NICHOLAS P. GODICI
*Attesting Officer*  *Acting Director of the United States Patent and Trademark Office*